United States Patent Office 2,718,517
Patented Sept. 20, 1955

2,718,517

POLYMERIZATION OF 1,2-DIHYDRO-2,2,4-TRIMETHYLQUINOLINE

James O. Harris, St. Albans, W. Va., assignor to Monsanto Chemical Company, St. Louis, Mo., a corporation of Delaware No Drawing. Application November 13, 1951,
Serial No. 256,160

10 Claims. (Cl. 260—88.3)

This invention relates to improvements in the conversion of 1,2-dihydro-2,2,4-trimethylquinoline into a hard pulverizable solid polymeric material.

The hard pulverizable solid polymeric material obtained upon treating 1,2-dihydro-2,2,4-trimethylquinoline with a concentrated non-oxidizing mineral acid is a valuable rubber antioxidant. The process of manufacture described in U. S. Patent 2,064,752 to Joseph R. Ingram involves heating 1,2-dihydro-2,2,4-trimethylquinoline with 10–55% by weight based upon the dihydroquinoline of concentrated hydrochloric acid for about 20 hours at substantially 85–90° C., neutralizing the thick viscous product so obtained with a benzene-caustic soda solution, separating the alkaline layer, and recovering the desired polymer from the solvent. However, the thick viscous reaction medium is difficult to process and the polymer obtained is often dark in color. The product possesses a melting point range of 100–118° C.

It is an object of this invention to provide an improved process for the conversion of 1,2-dihydro-2,2,4-trimethylquinoline into a hard pulverizable solid polymeric material. It is also an object of this invention to provide a more efficient and more economical process for the conversion of 1,2-dihydro-2,2,4-trimethylquinoline into a hard pulverizable solid polymeric material. It is also an object of this invention to provide a faster method of polymerization. Further objects will be apparent to those skilled in the art.

It has been discovered that these objects may be attained by the process which essentially consists in suitably adding sufficient hydrogen chloride to 1,2-dihydro-2,2,4-trimethylquinoline to convert at least 75% to the hydrochloride salt, heating in the presence of sufficient water to keep the mass a homogeneous liquid and subsequently isolating the desired polymer.

The following is illustrative of the new and improved process of this invention.

*Example*

To a suitable reaction vessel containing approximately 9.8 parts by weight of 19.65% by weight hydrochloric acid maintained at approximately 65–70° C. is added with agitation approximately 12 parts by weight of crude pulverized or molten 1,2-dihydro-2,2,4-trimethylquinoline containing approximately 2.5% by weight hydrogen chloride and the mix heated to about 95° C. The solution, which assays about 35.6% by weight water and contains a ratio of about 9:1 of the hydrochloride salt to free 1,2-dihydro-2,2,4-trimethylquinoline, is then heated at 95–96° C. for approximately 9 hours. Thereupon the solution is acidified with approximately 1.9 parts by weight of 19.65% by weight hydrochloric acid and approximately 35.9 parts by weight of water is added while constantly agitating. The percent total solids is about 19% by weight. The solution is then cooled to below 60° C. and added to approximately 12 parts by weight of a 25% by weight aqueous sodium hydroxide and approximately 53.4 parts by weight of water. The temperature is then increased to about 75° C. and maintained there until the fine particles of the polymer agglomerate. Upon cooling the mix the polymeric product is removed by filtration, washed with water, and dried. A yield of 94% of a cream colored product is obtained.

By employing substantially the same reaction conditions and substantially the same amounts of reactants but heating at 95–96° C. for 12 hours instead of 9 hours, a yield of 97% of a cream colored product possessing a melting point range of 106–114° C. is obtained.

Other dilute hydrochloric acid or muriatic acid solutions may be employed in the preparation of the hydrochloride salt of 1,2-dihydro-2,2,4-trimethylquinoline than that set forth in the foregoing example. For example 12–25% acid may be used, however, it is preferred to employ at least 15% acid and it is particularly preferred to employ approximately 20% hydrochloric acid. Other non-oxidizing mineral acids such as sulfuric acid may be employed, however, hydrochloric acid is preferred.

With 12%–25% hydrochloric acid a conversion of at least 75%, which is inclusive of but not more than 100% conversion, to 1,2-dihydro-2,2,4-trimethylquinoline salt produces highly satisfactory results. However, it is preferable that the hydrochloride salt conversion be in the range of 75–98% and particularly about 90%. Hydrochloride salt conversions in amounts below 75% do not produce a homogeneous liquid mix when 35% or more water is present. Hydrochloric acid addition in excess of that theoretically required to convert all of the 1,2-dihydro-2,2,4-trimethylquinoline to the salt is to be avoided in that polymerization is materially inhibited thereby.

While it is desirable to employ pure or substantially pure 1,2-dihydro-2,2,4-trimethylquinoline in the process of this invention, it has been found convenient to employ crude 1,2-dihydro-2,2,4-trimethylquinoline which crude contains hydrogen chloride in the order of 2% to 3% by weight as catalyst residue from its preparation from aniline and acetone.

In the preferred embodiment of this invention the amount of water required for a homogeneous liquid mix in the 1,2-dihydro-2,2,4-trimethylquinoline hydrochloride-free 1,2-dihydro-2,2,4-trimethylquinoline solution is approximately 35% by weight. However, water contents of 25 to 50% by weight may be employed provided a homogeneous liquid mix is obtained without appreciably affecting the ultimate yield of the desired polymeric product.

The heating of the aqueous 1,2-dihydro-2,2,4-trimethylquinoline hydrochloride-free 1,2-dihydro-2,2,4-trimethylquinoline solution is preferably carried out at 95–99° C. however, temperatures as low as 80° C. will yield good results. Although it has been found that polymerization of 1,2-dihydro-2,2,4-trimethylquinoline takes place chiefly during the first 4 to 6 hours of heating at 80 to 99° C., in order to obtain maximum polymerization at least 9 but usually not more than 12 hours is employed. Generally a polymerization time of 6 to 12 hours produces satisfactory results. Obviously the time of polymerization will depend upon the temperature and be inversely proportional thereto. From an economical standpoint optimum results are obtained by carrying out the polymerization at about 95–99° C. over approximately a 9 hour heating period. Temperatures above 99° C. may be employed, however, at such temperatures it is preferable to employ slight positive pressures.

Upon completion of the heating operation it is advantageous although not necessary to incorporate additional acid in order to bring the total acid to at least the theoretical amount but not more than 120% of the theoretical required for complete conversion to the hydrochloride salt and also to dilute with sufficient water to yield an aqueous solution containing about 20% solids.

Other amounts of water diluent yielding a solution containing 10–20% solids may be employed if so desired.

Although the amount of caustic employed in the neutralization step is preferably held to that amount theoretically required, amounts up to 165% of theory may be employed.

What is claimed is:

1. In the process of converting 1,2-dihydro-2,2,4-trimethylquinoline to a hard pulverizable solid the steps which comprise adding a sufficient amount of a mineral acid selected from the group consisting of hydrochloric and sulfuric acid to convert at least 75% of the 1,2-dihydro-2,2,4-trimethylquinoline to the salt but not more than the theoretical amount required to convert all of the 1,2-dihydro-2,2,4-trimethylquinoline to the salt and heating in the presence of sufficient water to keep the mass a homogeneous liquid.

2. In the process of converting 1,2-dihydro-2,2,4-trimethylquinoline to a hard pulverizable solid the steps which comprise adding sufficient hydrogen chloride in the form of a dilute aqueous solution to convert at least 75% of the 1,2-dihydro-2,2,4-trimethylquinoline to the hydrochloride salt but not more than the theoretical amount required to convert all of the 1,2-dihydro-2,2,4-trimethylquinoline to the salt and heating in the presence of sufficient water to keep the mass a homogeneous liquid.

3. In the process of converting 1,2-dihydro-2,2,4-trimethylquinoline to a hard pulverizable solid the steps which comprise adding sufficient hydrogen chloride in the form of a dilute aqueous solution to convert 75% to 98% of the 1,2-dihydro-2,2,4-trimethylquinoline to the hydrochloride salt and heating at about 80–99° C. in the presence of sufficient water to keep the mass a homogeneous liquid.

4. In the process of converting 1,2-dihydro-2,2,4-trimethylquinoline to a hard pulverizable solid the steps which comprise adding sufficient hydrogen chloride in the form of a dilute aqueous solution to convert 75% to 98% of the 1,2-dihydro-2,2,4-trimethylquinoline to the hydrochloride salt and heating at about 80–99° C. for approximately 4 to 12 hours in the presence of sufficient water to keep the mass a homogeneous liquid.

5. In the process of converting 1,2-dihydro-2,2,4-trimethylquinoline to a hard pulverizable solid the steps which comprise adding sufficient hydrogen chloride in the form of a 12–25% by weight aqueous solution to convert 75% to 98% of the 1,2-dihydro-2,2,4-trimethylquinoline to the hydrochloride salt and heating at about 80–99° C. for approximately 4 to 12 hours.

6. In the process of converting 1,2-dihydro-2,2,4-trimethylquinoline to a hard pulverizable solid the steps which comprise adding sufficient hydrogen chloride in the form of a 15–25% by weight aqueous solution to convert 75% to 98% of the 1,2-dihydro-2,2,4-trimethylquinoline to the hydrochloride salt and heating for 6 to 12 hours at 95–99° C.

7. In the process of converting 1,2-dihydro-2,2,4-trimethylquinoline to a hard pulverizable solid the steps which comprise adding sufficient hydrogen chloride in the form of a 15–25% by weight aqueous solution to convert approximately 90% of the 1,2-dihydro-2,2,4-trimethylquinoline to the hydrochloride salt and heating for 6 to 12 hours at 95–99° C.

8. In the process of converting 1,2-dihydro-2,2,4-trimethylquinoline to a hard pulverizable solid the steps which comprise adding sufficient hydrogen chloride in the form of a 15–25% by weight aqueous solution to convert approximately 90% of the 1,2-dihydro-2,2,4-trimethylquinoline to the hydrochloride salt and heating for approximately 9 hours at 95–99° C.

9. In the process of converting 1,2-dihydro-2,2,4-trimethylquinoline to a hard pulverizable solid the steps which comprise adding sufficient hydrogen chloride in the form of a 20% by weight aqueous solution to convert approximately 90% of the 1,2-dihydro-2,2,4-trimethylquinoline to the hydrochloride salt and heating for 6 to 12 hours at 95–99° C.

10. In the process of converting 1,2-dihydro-2,2,4-trimethylquinoline to a hard pulverizable solid the steps which comprise adding sufficient hydrogen chloride in the form of a 20% by weight aqeuous solution to convert approximately 90% of the 1,2-dihydro-2,2,4-trimethylquinoline to the hydrochloride salt and heating for approximately 9 hours at 95–99° C.

References Cited in the file of this patent

UNITED STATES PATENTS 2,064,752    Ingram _____ Dec. 15, 1936